United States Patent
Kumaran (10) Patent No.: US 10,872,088 B2
(45) Date of Patent: Dec. 22, 2020

(54) DOMAIN BASED INFLUENCE SCORING

(71) Applicant: Apple Inc., Cupertino, CA (US)

(72) Inventor: Saravana Kumar Siva Kumaran, Fremont, CA (US)

(73) Assignee: Apple Inc., Cupertino, CA (US)

( * ) Notice: Subject to any disclaimer, the term of this patent is extended or adjusted under 35 U.S.C. 154(b) by 258 days.

(21) Appl. No.: 15/814,212

(22) Filed: Nov. 15, 2017

(65) Prior Publication Data

US 2018/0217992 A1    Aug. 2, 2018

Related U.S. Application Data

(60) Provisional application No. 62/452,239, filed on Jan. 30, 2017.

(51) Int. Cl.
| G06F 17/30 | (2006.01) |
| G06F 16/2457 | (2019.01) |
| G06F 16/951 | (2019.01) |
| G06F 16/903 | (2019.01) |
| G06F 16/9535 | (2019.01) |

(52) U.S. Cl.
CPC .. G06F 16/24578 (2019.01); G06F 16/90348 (2019.01); G06F 16/951 (2019.01); G06F 16/9535 (2019.01)

(58) Field of Classification Search
None
See application file for complete search history.

(56) References Cited

U.S. PATENT DOCUMENTS

| 5,920,859 | A | 7/1999 | Li | |
| 6,877,002 | B2 * | 4/2005 | Prince | G06F 16/4387 707/749 |
| 7,672,985 | B2 * | 3/2010 | Bookman | G06F 16/30 707/755 |
| 8,826,444 | B1 * | 9/2014 | Kalle | H04N 21/8405 726/26 |
| 9,135,294 | B2 | 9/2015 | Ghosh et al. | |
| 9,348,912 | B2 * | 5/2016 | Tankovich | G06F 16/951 |
| 9,495,462 | B2 * | 11/2016 | Poznanski | G06F 16/9535 |
| 9,852,224 | B2 * | 12/2017 | Granstrom | G06F 16/9535 |
| 2006/0195439 | A1 | 8/2006 | Selberg | |
| 2007/0038601 | A1 | 2/2007 | Guha | |
| 2007/0067282 | A1 | 3/2007 | Prakash et al. | |
| 2007/0250498 | A1 | 10/2007 | Pedersen et al. | |

(Continued)

FOREIGN PATENT DOCUMENTS

WO    20140195958 A1    12/2014

OTHER PUBLICATIONS

European Search Report for European Patent Application No. EP17208018.6 dated Apr. 19, 2018.

(Continued)

*Primary Examiner* — Hung D Le (74) *Attorney, Agent, or Firm* — Jaffery Watson Mendonsa & Hamilton LLP (57) ABSTRACT

Methods and systems that create domain influence scores that can be used to rank or sort search results are described. In one embodiment, a domain influence scoring system begins by preselecting a subset of the domains and allocating an initial influence score to only the domains in the subset while all other domains have an initial influence score of zero. Then links to pages are counted to update the influence scores of each domain. Further, one or more blacklists can be used to modify updating of the influence scores.

27 Claims, 5 Drawing Sheets

(56) References Cited

U.S. PATENT DOCUMENTS

| | | |
|---|---|---|
| 2008/0082528 A1 | 4/2008 | Bonzi et al. |
| 2008/0086467 A1 | 4/2008 | Crumb et al. |
| 2008/0133591 A1* | 6/2008 | Bookman ............. G06F 40/205 |
| 2008/0172738 A1* | 7/2008 | Bates ...................... G06F 21/64 |
| | | 726/22 |
| 2008/0222135 A1 | 9/2008 | Chayes et al. |
| 2008/0222726 A1* | 9/2008 | Chayes ................. G06F 16/951 |
| | | 726/23 |
| 2012/0066359 A1 | 3/2012 | Freeman et al. |
| 2014/0195518 A1 | 7/2014 | Kelsey et al. |
| 2015/0332670 A1* | 11/2015 | Akbacak ............... G10L 15/063 |
| | | 704/9 |
| 2016/0055490 A1* | 2/2016 | Keren .................... G06Q 30/00 |
| 2016/0078359 A1* | 3/2016 | Csurka ................... G06N 7/005 |
| | | 706/12 |
| 2016/0125082 A1 | 5/2016 | Katic |
| 2016/0132904 A1 | 5/2016 | Mondal et al. |
| 2016/0142358 A1 | 5/2016 | Zunger et al. |
| 2016/0232248 A1 | 8/2016 | Ghosh et al. |
| 2018/0217992 A1 | 8/2018 | Kumaran |

\* cited by examiner

| | INFLUENCE SCORES | | |
|---|---|---|---|
| | INITIAL | INTERMEDIATE | FINAL |
| _ _ _.com | 0.001 | 0.015 | 0.023 — 401 |
| _ _ _.org | 0.0 | 0.005 | 0.004 — 403 |
| xxx.com | 0.0 | 0.0 | 0.0 — 405 |

DOMAIN BASED INFLUENCE SCORING

This application claims the benefit of U.S. Provisional Patent Application No. 62/452,239, filed on Jan. 30, 2017, which is incorporated herein by reference.

BACKGROUND

It is often the case that searches for information stored in one or more data processing systems produce a very large set of items in the search results. For example, a search for information on the Internet (e.g. a web search using Bing or Yahoo or Google) often produces a list of search results that includes thousands of items (e.g. web pages) in the search results. In order to make the search results more useful to users, the data processing systems that return the search results will sort or rank the results based on a rank or score that causes the list to show the items (e.g. web pages) in a particular order. The score for an item that is used to sort the items in the search results can be based on an influence score of a domain that provides the item, and each item in the results can have an influence score that is used to rank or sort the items within the search results. Systems that return search results use these influence scores that are developed based on an analysis of links to domains. The influence scores are developed by assigning a default minimum influence score to each and every domain in a corpus of domains that provide items such as web pages, and then the default minimum score is updated based on the number of links to a domain. A domain that links to or points to another domain contributes or donates a portion of its influence score to the another domain during the process of updating the influence scores. The final result of updating the influence scores produces a data set in which all domains have a positive (non-zero) influence score, with some domains having significantly higher influence scores than other domains.

SUMMARY OF THE DESCRIPTION

In one embodiment, a process of creating influence scores can begin by initializing a domain influence scoring system for only a subset of all of the domains; in particular, the system can be initialized by allocating a predetermined initial influence score to each domain in the subset (and these domains can be hand selected as important "trusted" domains) while all other domains have an initial influence score of zero. For example, if there are 100 domains in the subset (each of which is picked as an important and trusted domain), each of those 100 domains would be initialized with an initial influence score (IS) of 0.01 while all of the millions of other domains would be initialized with an initial IS of 0.0. After this initialization, known algorithms can be used to update influence scores for all domains based on links from one web page in a first domain to web pages in a second domain; these algorithms can "donate" or contribute a portion of the first domain's influence score to the second domain. A consequence of setting the initial IS=0 for most of the domains is that these domains (which had initial IS=0) can only attain a non-zero IS through "donations" or contributions from domains that attain or have a non-zero IS.

A method in one embodiment for creating domain influence scores that can be used to rank search results can include the following operations: obtaining a corpus of pages hosted by a set of domains, at least some of the pages including links to other pages; initializing a domain influence scoring system by allocating an initial influence score, such as a set of one or more predetermined initial influence scores, to each domain in a preselected subset of domains in the set of domains such that each domain in the preselected subset begins a process for deriving an updated influence score by having the predetermined initial influence score, which is greater than zero, while all other domains begin the process by having a zero initial influence score; and updating the initial scores for all domains by counting the links to the pages in the corpus. In one embodiment, the pages can be web pages, and a domain in the set of domains can be defined by a set of web addresses or Uniform Resource Identifiers (URI) owned or controlled by an entity. In one embodiment, the corpus can be obtained by crawling the Internet to obtain and store the corpus. In one embodiment, each page can be a discreet set of content at a specified URI, and the preselected subset of domains can be preselected at least in part by human selection or judgment based upon characteristics such as trust worthiness and/or importance, etc. In one embodiment, the other domains that are not in the preselected subset gain a non-zero influence score value only through links from domains that attain or have a non-zero influence score. In one embodiment, the updating of the influence scores create final influence scores which can be saved and used to rank or sort search results.

In one embodiment, a method can also include generating a blacklist of domains, where the blacklist is used during the process of updating the influence scores for all domains, and the blacklist includes a list of blacklisted domains. The process of updating influence scores can include techniques which take into account links to or from a blacklisted domain in order to calculate influence scores for other domains that are not blacklisted. For example, during the process of updating influence scores, a link from a blacklisted domain to another domain does not add, in one embodiment, to an influence score of the another domain. In another embodiment, during the process of updating influence scores, a link from a non-blacklisted domain to a blacklisted domain results in a negative score being added to the influence score value of the non-blacklisted domain.

Methods according to certain embodiments can also treat content posting domains differently than other domains such that authors within content posting domains are treated as domains separate from the host of the content posting domains. In one embodiment, the content posting domains can include at least one of social media or social network websites.

The various methods described herein can be performed by one or more data processing systems that obtain or create the corpus and then use the links within the corpus to derive influence scores and create a final ranking of domains based upon the final influence scores. In one embodiment, the process of creating influence scores may be repeated over time as the corpus of items, such as web pages, changes over time.

The methods and systems described herein can be implemented by data processing systems, such as server computers, desktop computers and other data processing systems and other consumer electronic devices. The methods and systems described herein can also be implemented by one or more data processing systems which execute executable computer program instructions, stored in one or more non-transitory machine readable media that cause the one or more data processing systems to perform the one or more methods described herein when the program instructions are executed. Thus, the embodiments described herein can include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments described herein can create domain influence scores that can be used to rank or sort search results. In one embodiment, a domain influence scoring system can begin by preselecting a subset of the domains and allocating an initial influence score to only the domains in the subset while all other domains have an initial influence score of zero. Then, links to pages can be counted to update the influence score of each domain to derive a final influence score for a domain. In one embodiment, this approach can decrease the influence of spam domains on search results to the point that they never attain a non-zero influence score value in some embodiments.

Figure 1:
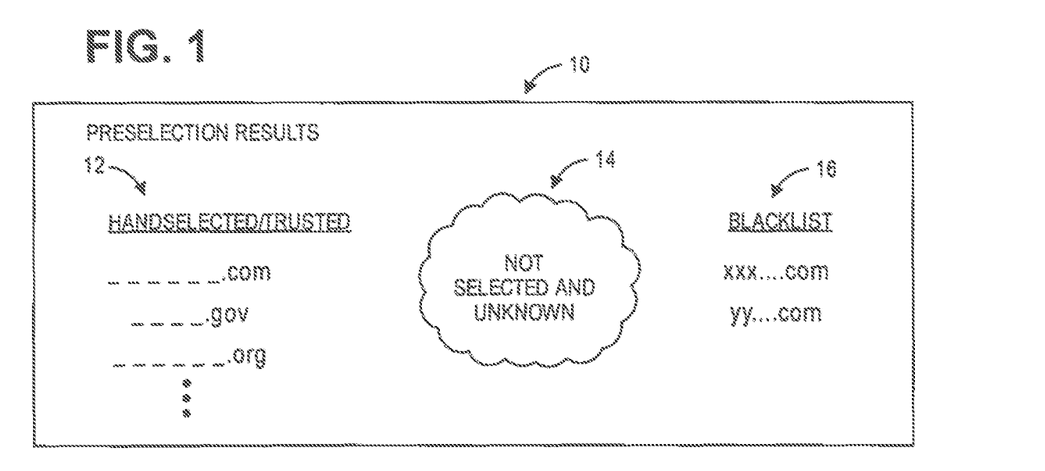
FIG. 1 shows an example of preselection results which can be used according to one or more embodiments described herein.

FIG. 1 shows an example according to one embodiment of how the influence score creation process can begin. The preselection results 10 shown in FIG. 1 show that there can be three groups of domains in the results 10. The group 12 represents a preselected set of domains which are regarded as trustworthy and/or important. In one embodiment, these domains may be selected, at least in part by hand based upon human judgment and can be a very small subset of the entire universe of domains in one embodiment. The domains in group 12 in one embodiment can receive a predetermined initial influence score which can be evenly or unevenly distributed among the domains in group 12. In one embodiment, all other domains will receive an initial influence score of zero, and this includes domains in the group 14 which are domains that were not selected to be in the group 12 and domains which can be unknown at the time when this process begins before the creation of a corpus of web pages or other items that the domains can provide. Group 16 represents a blacklist of blacklisted domains which are known to be spam domains or other domains that are regarded as not desirable to list in search results for example. The group 16 can also be hand selected based upon human judgment although techniques known in the art for identifying such blacklisted domains can also be used to generate a black list of domains.

Figure 2:
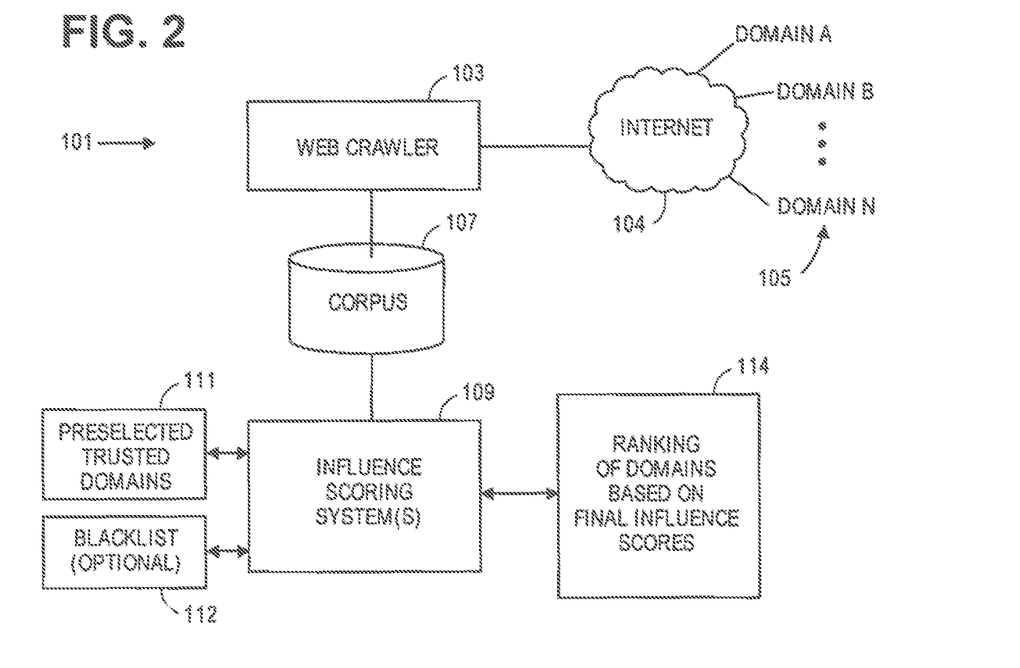
FIG. 2 shows an example of a system which can produce domain influence scores according to one or more embodiments described herein.

FIG. 2 shows an example of one or more data processing systems which can be used to create a corpus of items, such as web pages, from a plurality of domains which may exist. In one embodiment, the pages can be web pages and a domain in the set of domains can be defined by a set of web addresses or Uniform Resource Identifiers owned or controlled by an entity. In one embodiment, each page or item is a discreet set of content at a specified Uniform Resource Identifier. The web crawler 103, which is coupled to the Internet 104 can use conventional and known techniques to crawl the Internet to obtain pages from all the domains that are accessible through the Internet 104, such as domains 105 shown in FIG. 2. The web crawler 103 creates in one embodiment a corpus 107 which can include a data structure that describes each domain which was crawled and the links between domains such that it can be possible to process the data structure to determine the number of links to a particular domain from other domains. The corpus 107 can be stored in one or more databases after the web crawler 103 completes the process of crawling the Internet to create the corpus 107. Then the influence scoring system 109 can process the data structure within the corpus 107 to produce a ranking of domains based upon a final influence score, which is shown as ranking 114. The influence scoring system 109 can use the method shown in FIG. 3 in combination with the preselected trusted domains 111 and the blacklist 112 as shown in FIG. 2. In one embodiment, the preselected trusted domains 111 can be the group 12 shown in FIG. 1, and the blacklist 112 can be the blacklist shown as group 16 in FIG. 1.

Figure 3:
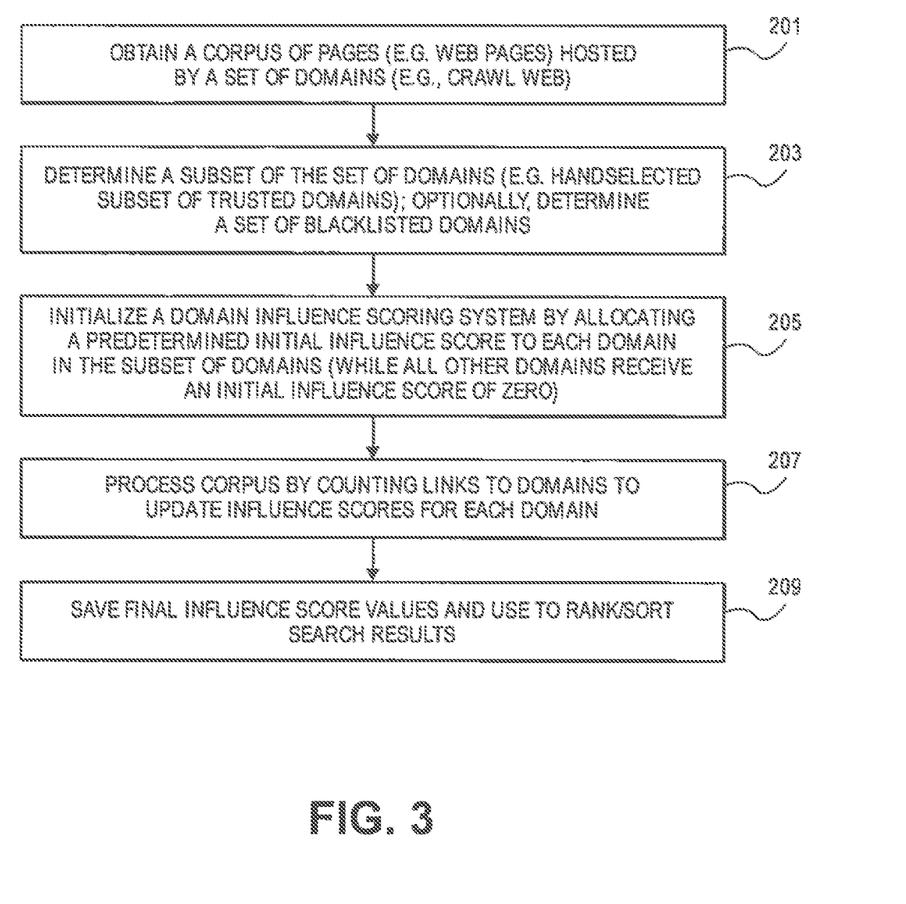
FIG. 3 is a flowchart which illustrates a method according to one or more embodiments described herein.

Referring now to FIG. 3, a method according to one or more embodiments described herein can begin in operation 201 in which one or more data processing systems obtain a corpus of pages, such as web pages that are hosted by a set of domains. In operation 203, which may proceed operation 201, a subset of the set of domains is determined. In one embodiment, this subset may be a hand selected subset of trusted domains, such as group 12 shown in FIG. 1. Optionally, operation 203 can also include determining a set of blacklisted domains to create a blacklist, such as the blacklist represented by group 16 in FIG. 1. Then in operation 205, the domain influence scoring system, such as the system 109 shown in FIG. 2, initializes the influence scoring process by allocating a predetermined initial influence score to each domain in the subset of domains while all other domains receive an initial influence score of zero. In one embodiment, the predetermined initial influence score for domains in the subset can be the same value for all domains within the subset. In another embodiment, the initial influence score can be unevenly allocated among the domains in the subset by using human judgment or other techniques to spread the initial influence scores unevenly across the domains in the subset of domains. The phrase "predetermined initial influence score" will be understood to include either an even distribution of the initial influence scores or an uneven distribution of the initial influence scores among the domains in the subset of domains. In either case, all other domains that are not in the subset begin the process of creating influence scores with an initial influence score of zero.

Figure 4:
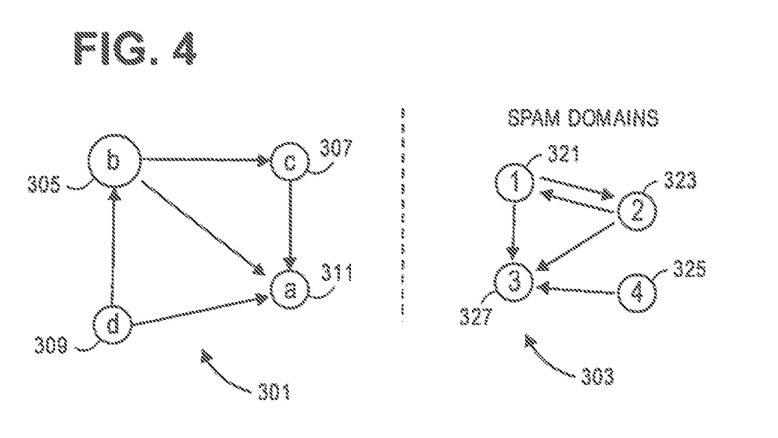
FIG. 4 shows an example of domains in a corpus of domains and the links between the domains.
Figure 5:
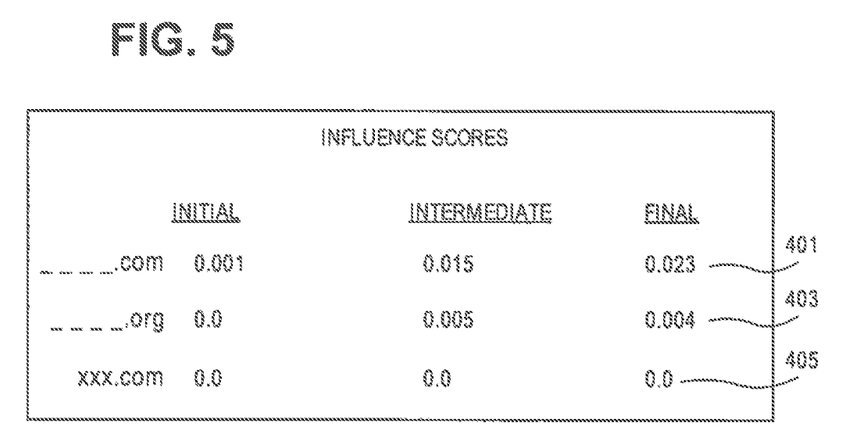
FIG. 5 is a chart which illustrates influence scores generated during a process of creating domain influence scores according to one or more embodiments described herein.

After operation 205, operation 207 can be used to process the corpus by counting links to domains to update the influence scores for each domain. Operation 207 can use techniques known in the art to create influence scores by updating the initial influence scores created in operation 205. In addition, operation 207 can also use methods described in conjunction with FIGS. 6, 7, and 8 to updated influence scores. FIGS. 4 and 5 illustrate, in one or more embodiments, processes for updating the influence scores for each domain. After operation 207 is completed, the final influence score values for each domain can be saved in operation 209 and can be used to rank or sort search results by using the influence scores for the domain to rank or sort the search results.

FIG. 4 shows an example of how influence scoring can be updated based upon links to a domain in a corpus of pages. The set of domains 301 includes four domains 305, 307, 309, and 311. Domain 309 has two links, one of which links to or points to domain 305 and the other of which points to or links to domain 311. Domain 305 has one link from another domain and two links which point to other domains (domains 307 and 311). Domain 307 has one link which points to another domain, domain 311, and has a link which points to it (the link from domain 305). The process of calculating influence scores can count the number of links to a page in a domain and use that count to modify or update an initial influence score. If domain 309 had a non-zero initial influence score, then its final initial influence score will be reduced as a result of the two links which donate or contribute influence scores to two other domains as shown in FIG. 4. If domain 309 had an initial influence score of zero, then its final influence score can remain at zero. If domain 305 has an initial influence score of zero and domain 309 also has an initial influence score of zero, then both domains 305 and 309 can have a final influence score of zero in one embodiment. On the other hand, other domains 307 and 311 can attain a non-zero influence score at least by virtue of the links from other domains. Domain 311 can attain at least a value of an influence score which is based upon having three links to it in one embodiment. Similarly, domain 307 can attain a final influence score of at least one link value or a representation of that one link value in an influence scoring system. FIG. 4 also illustrates a set 303 of spam domains which includes domains 321, 323, 325, and 327 each of which includes at least one link as shown in FIG. 4. In one embodiment, the spam domains can be blacklisted and would normally have a zero initial influence score. FIG. 5 shows, in row 405, an example of a blacklisted domain which begins with a zero initial influence score in the influence scoring process and ends with a final influence score of zero in one embodiment. Row 401 shows an example of a domain that was within the preselected set of domains, such as group 12 shown in FIG. 1. That domain in row 401 begins with an initial influence score that is non-zero and attains a final influence score which is non-zero. The column "intermediate" shows the influence score values for each of those three domains in rows 401, 403, and 405 before the influence scoring process is completed. It can be seen that it is possible for the intermediate influence score value to be higher than the final influence score value in one embodiment based upon, for example, the method shown in FIG. 7. Row 403 shows an example of a domain which begins with an initial influence score of zero but attains a non-zero influence score as a result of links from other domains that start with or attain a non-zero influence score.

Figure 6:
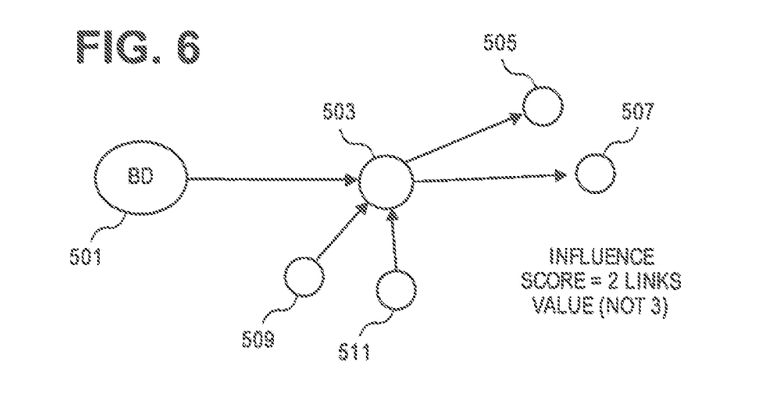
FIG. 6 shows an example of several domains in a corpus of domains and the links between those domains according to one embodiment described herein.

FIG. 6 shows a method which can be used during the process of calculating final influence scores when the method uses a blacklist which includes blacklisted domains, such as blacklisted domain 501. In the example shown in FIG. 6, a link from a blacklisted domain, blacklisted domain 501, does not add to domain 503's influence score. In other words, a link from a blacklisted domain to a domain, such as domain 503 does not add to the influence score of the domain 503. Thus, the influence score of domain 503 has a value based upon two links to it (from domains 509 and 511 which are not blacklisted). Thus, a link from a blacklisted domain is not included in the count of links that point to a particular domain in one embodiment.

Figure 7:
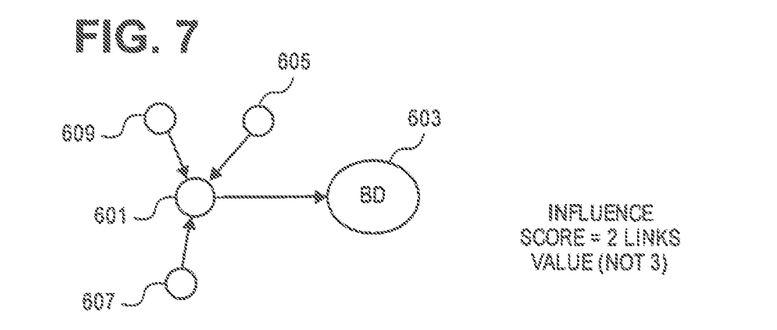
FIG. 7 shows an example of a set of domains within a corpus of domains and the links between those domains according to one embodiment described herein.

FIG. 7 shows an example of another technique which can be used when calculating influence scores with the use of a blacklist of domains. In the example shown in FIG. 7, domain 601 has a link to a blacklisted domain 603. In addition, three links (from domains 605, 607, and 609) point to or link to domain 601. In one embodiment, if domains 603 was not a blacklisted domain, domain 601 would have an influence score which includes a value representative of three links to domain 601. However, because domain 603 is a blacklisted domain, the link from domain 601 is treated as a negative value relative to the influence score of domain 601. In particular, in one embodiment, the link from domain 601, which is not blacklisted, to a blacklisted domain such as blacklisted domain 603 will result in a negative score being added to domain 601's influence score, thereby reducing the cumulative influence score of domain 601. In one embodiment, each domain can have an influence score that is a linear addition of both a traditional influence score value and negative score values which result from links to blacklisted domains.

By using an initialization operation such as the operation 205 shown in FIG. 3 along with the techniques described relative to FIGS. 6 and 7, it is possible to minimize or eliminate influence scores for spam domains and other undesirable domains, which can provide improved search results which may be considered safer and more secure than traditional techniques.

Figure 8:
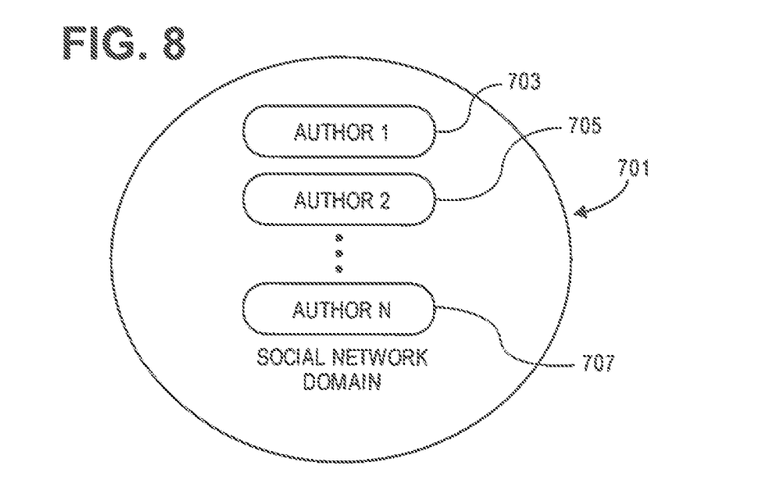
FIG. 8 shows an example of a social network domain and sub-domains within that domain according to one embodiment described herein.

FIG. 8 shows another technique which can be used with one or more embodiments described herein. The approach shown in FIG. 8 divides a social network or social media domain into a subset of domains based upon the different authors or other contributors to the social network or social media domain. For example, each author in a Facebook domain or each author in a Twitter domain can be treated as a separate domain which is separate and distinct from the host domain (e.g., the Facebook domain) and separate and distinct from other authors in the same social network domain. An author is anyone who authors or contributes to content in the subdomain. In the case shown in FIG. 8, the social network domain 701 hosts a variety of different authors, shown as author 703, 705, and 707 each of which post (e.g. contribute or author) content on the social network domain which hosts the content. For example, author 703 can post content on a page or wall of a Facebook domain. Each of these authors 703, 705, and 707 is treated as a separate and distinct domain and processed as described herein, using for example the method shown in FIG. 3. In addition, methods used within operation 706 can employ the techniques shown in FIGS. 6 and 7 in conjunction with the subdivision shown in FIG. 8. For example, one particular author may be included in the subset of domains (e.g., group 12) while another author may be blacklisted and listed in group 16.

The embodiments described herein may be applicable to various different types of data including, for example, web pages in the Internet, pages in a social network, content in social media, and even searching within an application (app) which may not be a web browser app. For example, many apps can provide for searching within the app or application, and those search results can be ranked using the techniques described herein to provide a safer or more secure set of search results for use within the application.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include server systems, desktop computers, laptop computers, embedded electronic devices, or consumer electronic devices.

Figure 9:
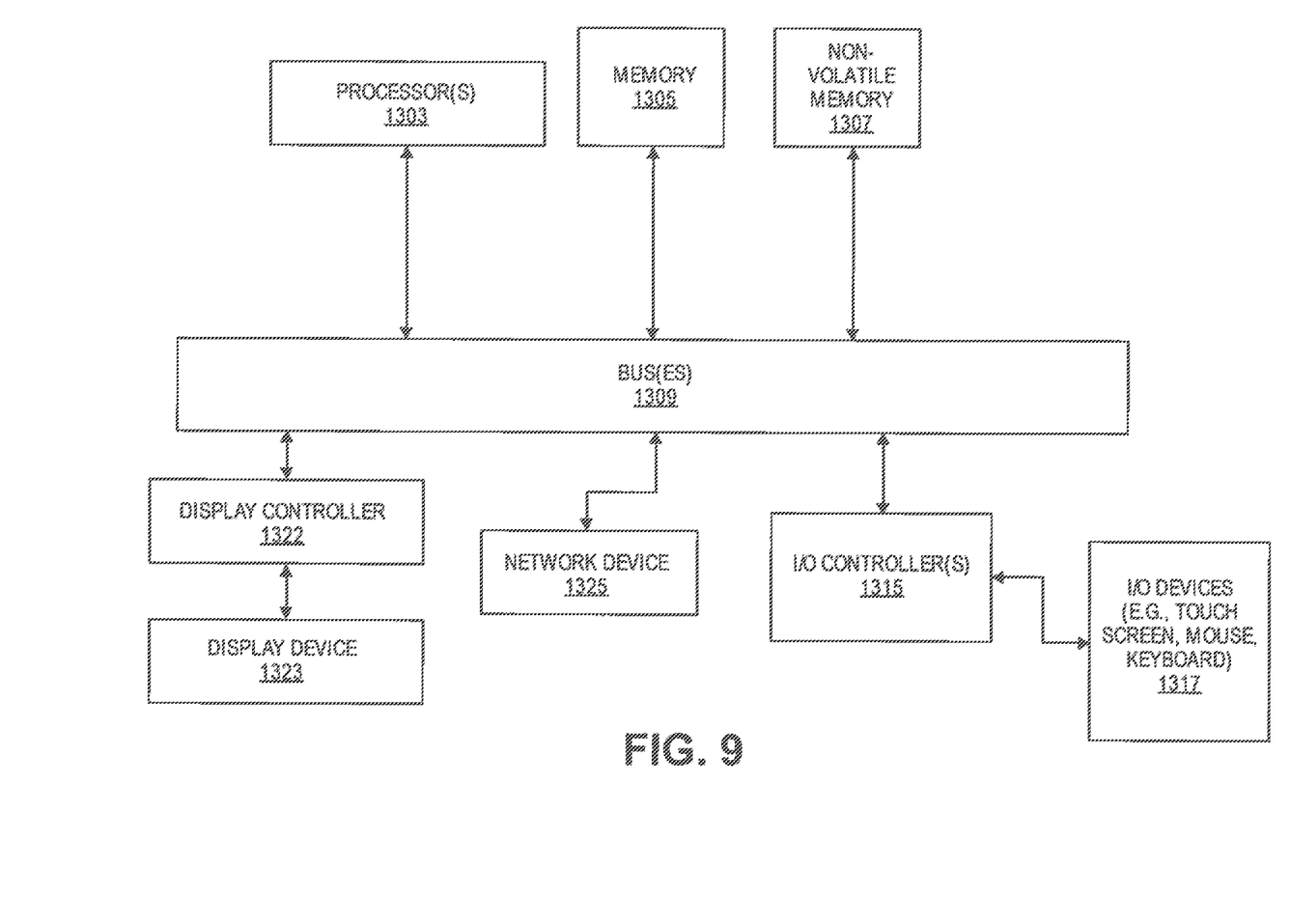
FIG. 9 shows an example of a data processing system which can be used with one or more embodiments described herein.

FIG. 9 is a block diagram of data processing system hardware according to an embodiment. Note that while FIG. 9 illustrates the various components of a data processing system that may be incorporated into a server system or other computer system, it is not intended to represent any particular architecture or manner of interconnecting the components as such details are not germane to the present invention. It will also be appreciated that other types of data processing systems that have fewer components than shown or more components than shown in FIG. 9 can also be used with the present invention.

As shown in FIG. 9, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a display device 1323. The display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 9 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WI-FI, Bluetooth).

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g. DRAM or flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A method for creating domain influence scores that can be used to rank search results, the method comprising:
obtaining a corpus of pages hosted by a set of domains, at least some of the pages including links to other pages;
initializing a domain influence scoring system by allocating a predetermined initial influence score to each domain in a preselected subset of domains in the set of domains such that each domain in the preselected subset begins a process for deriving an updated influence score by having the predetermined initial influence score, which is greater than zero, while all other domains begin the process by having a zero initial influence score; and updating the influence scores for all domains in the set by counting the links to pages in the corpus.

2. The method of claim 1, wherein the pages are web pages and a domain in the set of domains is defined by a set of web addresses or Uniform Resource Identifiers owned or controlled by an entity.

3. The method of claim 1, the method comprising:
crawling the Internet to obtain information on the corpus of pages including links to pages between domains within the corpus and storing the information,
wherein the updating the influence scores further comprises calculating an influence score for a domain in the set using a count of the links to the pages between the domain and other domains within the corpus.

4. The method of claim 1, wherein each page is a discreet set of content at a specified URI (Uniform Resource Identifier), and wherein the preselected subset of domains is preselected at least in part by human selection.

5. The method of claim 1, wherein other domains not in the preselected subset of domains gain a non-zero influence score value during the process only through links from pages in domains that attain or have a non-zero influence score; and wherein the updating creates final influence scores which are saved and used to rank search results.

6. The method of claim 5, wherein the method further comprises:
generating a blacklist of domains, the blacklist used while updating the influence scores for all domains, and the blacklist includes a list of blacklisted domains.

7. The method of claim 6, wherein during the updating, a link from a blacklisted domain to another domain does not add to an influence score value of the another domain.

8. The method of claim 6, wherein during the updating, a link from a non-blacklisted domain to a blacklisted domain results in a negative score being added to the influence score value of the non-blacklisted domain.

9. The method of claim 1, wherein authors within content posting domains are treated as domains separate from the host of the content posting domains.

10. The method of claim 9, wherein the content posting domains include at least one of social media or social network web sites.

11. A non-transitory machine readable medium storing instructions which when executed by one or more data processing systems cause the one or more systems to perform a method for creating domain influence scores that can be used to rank search results, the method comprising:
obtaining a corpus of pages hosted by a set of domains, at least some of the pages including links to other pages;
initializing a domain influence scoring system by allocating a predetermined initial influence score to each domain in a preselected subset of domains in the set of domains such that each domain in the preselected subset begins a process for deriving an updated influence score by having the predetermined initial influence score, which is greater than zero, while all other domains begin the process by having a zero initial influence score; and
updating the influence scores for all domains in the set by counting the links to the pages in the corpus.

12. The medium of claim 11, wherein the pages are web pages and a domain in the set of domains is defined by a set of web addresses or Uniform Resource Identifiers owned or controlled by an entity.

13. The medium of claim 11, the method comprising:
crawling the Internet to obtain information on the corpus of pages including links to pages between domains within the corpus and storing the information,
wherein the updating the influence scores further comprises calculating an influence score for a domain in the set using a count of the links to the pages between the domain and other domains within the corpus.

14. The medium of claim 11, wherein each page is a discreet set of content at a specified URI (Uniform Resource Identifier), and wherein the preselected subset of domains is preselected at least in part by human selection.

15. The medium of claim 11, wherein other domains not in the preselected subset of domains gain a non-zero influence score value only through links from domains that attain or have a non-zero influence score; and wherein the updating creates final influence scores which are saved and used to rank search results.

16. The medium of claim 15, wherein the method further comprises:
generating a blacklist of domains, the blacklist used while updating the influence scores for all domains, and the blacklist includes a list of blacklisted domains.

17. The medium of claim 16, wherein during the updating, a link from a blacklisted domain to another domain does not add to an influence score value of the another domain.

18. The medium of claim 16, wherein during the updating, a link from a non-blacklisted domain to a blacklisted domain results in a negative score being added to the influence score value of the non-blacklisted domain.

19. The method of claim 11, wherein authors within content posting domains are treated as domains separate from the host of the content posting domains.

20. The medium of claim 19, wherein the content posting domains include at least one of social media or social network web sites.

21. A device for creating domain influence scores that can be used to rank search results, the device comprising:
a non-transitory machine-readable medium to store instructions;
one or more processors to execute the instructions; and
a memory coupled to the one or more processors, the memory to store the instructions which, when executed by the one or more processors, cause the one or more processors to:
obtain a corpus of pages hosted by a set of domains, at least some of the pages including links to other pages;
initialize a domain influence scoring system by allocating a predetermined initial influence score to each domain in a preselected subset of domains in the set of domains such that each domain in the preselected subset begins a process for deriving an updated influence score by having the predetermined initial influence score, which is greater than zero, while all other domains begin the process by having a zero initial influence score; and
update the influence scores for all domains in the set by counting the links to pages in the corpus.

22. The device of claim 21, the instructions further cause the one or more processors to:
crawl the Internet to obtain information on the corpus of pages including links to pages between domains within the corpus and storing the information, wherein the updating the influence scores further comprises calculating an influence score for a domain in the set using a count of the links to the pages between the domain and other domains within the corpus.

23. The device of claim 21, wherein each page is a discreet set of content at a specified URI (Uniform Resource Identifier), and wherein the preselected subset of domains is preselected at least in part by human selection.

24. The device of claim 21, wherein other domains not in the preselected subset of domains gain a non-zero influence score value during the process only through links from pages in domains that attain or have a non-zero influence score; and wherein the updating creates final influence scores which are saved and used to rank search results.

25. The device of claim 24, wherein the method further comprises:
   generate a blacklist of domains, the blacklist used while updating the influence scores for all domains, and the blacklist includes a list of blacklisted domains.

26. The device of claim 24, wherein during the updating, a link from a blacklisted domain to another domain does not add to an influence score value of the another domain.

27. The device of claim 24, wherein during the updating, a link from a non-blacklisted domain to a blacklisted domain results in a negative score being added to the influence score value of the non-blacklisted domain.

* * * * *